United States Patent Office 3,395,218

Patented July 30, 1968

3,395,218

NONLIVING NEMATODE VACCINES

Paul Hyman Silverman, Champaign-Urbana, Ill., assignor to Allen & Hanburys Limited, London, England, a British company No Drawing. Continuation of application Ser. No. 245,381, Dec. 18, 1962, which is a continuation-in-part of application Ser. No. 51,796, Aug. 25, 1960. This application Nov. 9, 1965, Ser. No. 507,035

Claims priority, application Great Britain, Sept. 2, 1959, 29,943/59

15 Claims. (Cl. 424—88)

ABSTRACT OF THE DISCLOSURE

Nonliving vaccines effective in the protection of animals, have been produced by incubation of third-stage infective nematode larvae, in vitro in an aqueous medium, into histotrophic stages, preferably in the presence of an antibiotic, followed by lyophilization.

This invention relates to vaccines against diseases caused by nematodes which are pathogenic to vertebrates and is a continuation-in-part of the invention of my appication Ser. No. 51,796 filed Aug. 25, 1960 and a continuation of my application No. 245,381, filed Dec. 18, 1962, both now abandoned.

A considerable volume of work on helminth immunity has been published in the literature over at least the last three decades.

This work includes the investigation of naturally acquired immunity (i.e., that immunity which follows a natural infection) self cure and artificial immunity. Much of the work has centered round *Haemonchus contortus, Trichinella spiralis* and *Nippostrongylus muris* (a parasite of little economic importance).

Naturally acquired immunity and self cure are inevitably procured at the price of suffering by the host since the presence of living parasites within the host's body is synonymous with infection and disease.

The materials used by injection in attempts to produce artificial immunity have been largely whole adult worm preparations or fractionated extracts of them. Infective third stage larvae, their excretions and secretions and extracts of oesophagus of third stage larvae have been investigated. Although antibodies have been induced in animals by administration of various nonliving helminth materials, these antibodies have induced little or no protective immunity and hitherto it has appeared essential for living worms to be present within the host in order to induce satisfactory protective immunity (see Soulsby, Vet. Rev. Annot., 1958, 4, 1–16).

The present invention provides an injectable nonliving vaccine effective against diseases caused by nematodes pathogenic to vertebrates consisting essentially of third stage nematode larvae incubated at between 35° and 40° C., preferably at about 37° C., in vitro into histotrophic stages in a sterile aqueous culture medium. With reference to the classification shown in Hyman "The Invertebrates" McGraw Hill, New York (1951) pp. 54–59, the nematodes involved in the present invention belong to the two orders Rhabdiasoidea and Strongyloidea.

The production of this vaccine has been made possible by the development of a satisfactory process for the in vitro culture of the parasites during their antigen-producing stages.

The work which has resulted in the present invention indicates that there are at least two antigens involved in producing immunity in the present cases, namely:

(1) Antigens produced during the development of the histotrophic stages of the larvae, i.e., excretions, secretions and metabolic products.

(2) Somatic antigens, i.e., those contained in the larvae.

It is preferred, however, that the vaccine should also include the antigens produced either during exsheathment of third stage larvae or during the stage of the life cycle corresponding to penetration of host tissue by third stage larvae.

The antigenicity of these components has been established by skin sensitisation tests which are based upon the phenomenon that an immune or infected animal will produce an erythematous response to an antigen and/or a localized oedema when it is injected intradermally. This type of reaction is measurable and specific. As will appear hereinafter, in certain cases this antigenicity has been confirmed by immunity studies on susceptible laboratory and other animals.

In the case of the parasites which have been investigated more fully, it has been established that a preparation comprising the products of metabolism of parasite ecdysis and the somatic antigens of the histotrophic forms of the parasite will produce a degree of immunity in the natural host.

Accordingly the present invention also provides a process for the preparation of an injectable, veterinary nonliving vaccine effective against diseases caused by nematodes pathogenic to vertebrates which comprises incubating at between 35° and 40° C. preferably at about 37° C., third stage infective nematode larvae into the histotrophic stages in vitro in a sterile aqueous culture medium. The medium containing larvae may be used as a vaccine or the said culture medium and the larvae contained therein may be dried, preferably by freeze-drying and the dried material suspended in a sterile aqueous vehicle to produce a vaccine.

Preferably the secretions produced during the exsheathment of third stage larvae or during the stage of the life cycle corresponding to pentration of host tissue are added either before or after drying of the culture medium in which the histotrophic larval stages are produced or to the finished vaccine.

According to a preferred embodiment, the process of the present invention is carried out as follows:

Third stage infective larvae are collected from the faeces of infected animals, the faeces having been incubated under suitable conditions for the third stage larvae to develop. The cleaned larvae are then immersed in a medium to induce exsheathment. When exsheathment has taken place, the larvae are separated from the solution which is reserved. The larvae are then suspended in a small volume of an aqueous solution of a suitable antimicrobial agent or mixture of such agents to reduce the possibility of bacterial and other contamination. Known antibiotics are suitable for this purpose, e.g., penicillin and streptomycin. The larvae are then separated and placed in a sterile balanced salt solution containing nutrient material to permit their development into the histotrophic stages. Incubation is carried out at about 37° C. with oxygenation and agitation if necessary until test samples demonstrate the appropriate degree of larval development. The culture medium and its contained larvae is then frozen and dried by freeze-drying. The reserved solution from the exsheathment process, first treated to remove any unwanted inorganic ions, may be added before drying. The dried antigenic material thus obtained is suspended in a sterile aqueous vehicle before injection. Suitable known adjuvants such as aluminium hydroxide may be used with the antigenic materials.

The following examples illustrate the invention:

Example 1.—Preparation of a vaccine against *Dictyocaulus viviparus*

A clean suspension of infective third stage larvae of *Dictyocaulus viviparus* in water was prepared from the incubated faeces of calves previously infected with the parasite. The suspension was stored for 12 days at 15° C. was then centrifuged for two minutes and the supernatant liquid replaced with gastric pepsin solution. The suspension was incubated at 37° C. until check counts indicated that more than 90% of the larvae had exsheathed. At this stage the suspension was again centrifuged and the supernatant liquid was removed, neutralized with sodium carbonate solution, distributed into 2 ml. volumes and frozen. The exsheathed larvae were then placed into a solution containing penicillin and streptomycin 1000 units per ml. and nystatin 250 units per ml. and left for one hour at room temperature. The larvae were then washed with sterile water and transferred to bottles containing the culture medium which consisted of Tyrodes solution with added extract of liver. Incubation at 37° C. followed until not less than 60% of the larvae had developed into the fourth stage. The culture medium and larvae were then transferred in the required volumes into suitable containers and freeze dried. When required for use the freeze dried antigens were pulverised and suspended in sterile water and the required volume of the exsheathing medium was added.

Example 2.—Preparation of a vaccine against *Haemonchus contortus*

A clean suspension of infective third stage larvae of *Haemonchus contortus* in water was prepared from the incubated faeces of sheep previously infected with the parasite. This suspension was centrifuged for two minutes and the supernatant liquid was removed and replaced with a solution containing 0.03% of sodium hypochlorite and 0.5% of sodium chloride. The suspension was incubated at 37° C. until check counts indicated that more than 90% of the larvae had exsheathed. At this stage the suspension was again centrifuged and the supernatant liquid was removed, and dialyzed against distilled water and distributed into 2 ml. volumes and frozen. The exsheathed larvae were then placed into a solution containing penicillin and streptomycin 1000 units per ml. and nystatin 250 units per ml. and left for one hour at room temperature. The larvae were then washed with sterile water and transferred to bottles containing the culture medium which consisted of Earle's solution containing the products of hydrolysis of liver and casein.

Incubation at 37° C. followed until not less than 60% of the larvae had developed into the fourth stage. The culture medium and larvae were then transferred in the required volumes into containers and freeze dried. When required for use the freeze dried antigens were pulverized and suspended in sterile water and the required volume of the exsheathing medium was added.

Example 3.—Preparation of a vaccine against *Ostertagia ostertagi*

A clean suspension of infective third stage larvae of *Ostertagia ostertagi* in water was prepared from the incubated faeces of calves previously infected with the parasite. This suspension was allowed to settle, the supernatant fluid was removed and replaced by a solution of sodium hypochlorite 0.075% and sodium chloride 1.5%. The suspension was left at room temperature until check counts indicated that more than 90% of the larvae had exsheathed. At this stage the suspension was centrifuged, the supernatant liquid removed, dialyzed against distilled water, distributed in convenient volumes and frozen. The exsheathed larvae were washed with sterile water, centrifuged and placed in a solution containing penicillin and streptomycin 1000 units per ml. and nystatin 250 units per ml. and left for one hour at room temperature. The larvae were then washed again with sterile water and transferred to bottles containing the culture medium which consisted of Earle's solution containing products of hydrolysis of liver. The culture bottles were then incubated at 37° C. on a rocking machine until not less than 60% of the larvae had developed into the fourth stage. The culture medium and larvae were then transferred in the required volumes into containers and freeze-dried. When required for use the freeze-dried antigens were pulverized and suspended in sterile water and the required volume of exsheathing liquid was added.

Example 4.—Preparation of a vaccine against *Strongylus vulgaris*

A clean suspension of infective third stage larvae of *Strongylus vulgaris* in water was prepared from the incubated faeces of horses previously infected with this parasite. This suspension was allowed to settle, the supernatant liquid was removed and replaced by a solution of sodium hypochlorite 0.075% and sodium chloride 1.5%. The suspension was left at room temperature until check counts indicated that more than 90% of the larvae had exsheathed.

At this stage the suspension was centrifuged, the supernatant liquid was removed and dialyzed against distilled water, distributed in convenient volumes and frozen. The exsheathed larvae were washed with sterile water, centrifuged and placed in a solution containing penicillin and streptomycin 1000 units per ml. and nystatin 250 units per ml. and left for one hour at room temperature. The larvae were then washed again with sterile water and transferred to bottles containing the culture medium which consisted of Earle's solution containing products of hydrolysis of liver.

The culture bottles were then incubated at 37° C. on a roller tube machine until not less than 60% had developed into fourth stage larvae. The culture medium and larvae were then transferred in the required volumes into containers and freeze dried. When required for use the freeze dried antigens were pulverized and suspended in sterile water and the required volume of exsheathing liquid was added.

Example 5.—Preparation of a vaccine against *Trichostrongylus axei*

A clean suspension of infective third stage larvae of *Trichostrongylus axei* in water was prepared from incubated faeces of sheep previously infected with the parasite. This suspension was allowed to settle, the supernatant liquid removed and replaced by a solution containing sodium hypochlorite 0.075% and sodium chloride 1.5%. The suspension was left at room temperature until check counts indicated that more than 90% of the larvae had exsheathed.

At this stage the suspension was centrifuged, the supernatant liquid was removed, dialyzed against distilled water, distributed in convenient volumes and frozen. The exsheathed larvae were washed with sterile water, centrifuged and placed in a solution containing penicillin and streptomycin 1000 units per ml. and nystatin 250 units per ml. and left for one hour at room temperature. The larvae were then washed again with sterile water and transferred to bottles containing the culture medium which consisted of tissue culture solution No. 199.

The culture bottles were then incubated at 37° C. on a rocking machine until not less than 60% had developed into fourth stage larvae. The culture medium and larvae were then transferred in the required volumes into containers and freeze-dried. When required for use the freeze-dried antigens were pulverized and suspended in sterile water and the required volume of exsheathing liquid was added.

Example 6.—Preparation of a vaccine against *Strongyloides papillosus*

A clean suspension of infective third stage larvae of *Strongyloides papillosus* in water was prepared from incubated faeces of sheep previously infected with the parasite. This suspension was allowed to settle, the supernatant liquid was removed and the larvae were placed in a solution containing penicillin and streptomycin 1000 units per ml. and nystatin 250 units per ml. and left for one hour at room temperature. The suspension was then centrifuged, the larvae washed with sterile water and transferred to culture bottles containing the culture medium which consisted of Tyrode solution modified by omission of glucose with products of hydrolysis of liver.

The bottles were then incubated at 37° C., on a rocking machine until not less than 60% of the larvae had developed to the fourth stage. The culture medium and larvae were then transferred in the required volumes into containers and freeze dried. When required for use the freeze dried antigens were pulverized and suspended in sterile water.

Example 7.—Preparation of a vaccine against *Ostertagia circumcincta*

A clean suspension of infective third stage larvae of *Ostertagia circumcincta* in water was prepared from incubated faeces of sheep previously infected with the parasite. This suspension was allowed to settle, the supernatant liquid was removed and replaced by a solution containing sodium hypochlorite 0.075% and sodium chloride 1.5%. The suspension was left at room temperature until check counts indicated that more than 90% of the larvae had exsheathed.

At this stage the suspension was centrifuged, the supernatant liquid was removed and dialyzed against distilled water, distributed in convenient volumes and frozen. The exsheathed larvae were washed with sterile water, centrifuged and placed in a solution containing penicillin and streptomycin 1000 units per ml. and nystatin 250 units per ml. and left for one hour at room temperature. The larvae were then washed again with sterile water and transferred to bottles containing the culture medium, which consisted of Earl's solution with products of hydrolysis of liver.

The culture bottles were then incubated at 37° C. on a roller tube machine until not less than 60% of the larvae had developed into the fourth stage. The culture medium and larvae were then transferred in the required volumes into containers and freeze-dried. When required for use the freeze-dried antigens were suspended in the addition of sterile water and the required amount of exsheathing liquid was added.

Example 8.—Preparation of a vaccine against *Trichostrongylus colubriformis*

A clean suspension of infective third stage larvae of *Trichostrongylus colubriformis* in water was prepared from incubated faeces of sheep previously infected with the parasite. This suspension was allowed to settle, the supernatant liquid was removed and replaced by a solution containing sodium hypochlorite 0.075% and sodium chloride 1.5%. The suspension was left at room temperature until check counts indicated that more than 90% of the larvae had exsheathed.

At this stage the suspension was centrifuged, the supernatant liquid was removed, dialyzed against distilled water, distributed in convenient volumes and frozen. The exsheathed larvae were washed with sterile water, centrifuged and placed in a solution containing penicillin and streptomycin 1000 units per ml. and nystatin 250 units per ml. and left for one hour at room temperature. The larvae were then washed again with sterile water and transferred to bottles containing the culture medium which consisted of Hank's solution with products of hydrolysis of liver.

The culture bottles were then incubated at 37° C. on a rocking machine until not less than 60% of the larvae had developed into the fourth stage. The culture medium and larvae were then transferred in required volumes into containers and freeze dried.

When required for use the freeze dried antigens were pulverised and suspended in sterile distilled water and the required amount of exsheathing liquid was added.

Calves which had been naturally infected with *Dictyocaulus viviparus* or *Ostertagia ostertagi,* sheep which had been naturally infected with *Haemonchus contortus, Strongyloides papillosus, Trichostrongylus colubriformis* or *Trichostrongylus axei* and horses which had been naturally inefected with *Strongylus vulgaris* were subjected to controlled sensitivity tests by the intradermal injection of the appropriate vaccine. In all cases a typical positive flare and wheal reaction occurred in the infected animals whereas no such reaction occurred in the uninfected control animals. These experiments showed that the antigens contained in the several vaccines were homologous with those produced in the several infections.

The vaccine prepared in accordance with Example 1 was tested as follows:

(A) A group of guinea pigs were given two intraperitoneal injections of the vaccine with an interval of 21 days between the injections. Each injection was the equivalent of 3000 to 5000 *Dictyocaulus viviparus* larvae. Ten days after the second injection the vaccinated guinea pigs and a similar group of untreated guinea pigs were challenged with 5000 normal infection larvae per os. Nine days after challenge all the animals were killed and their lugs examined. The vaccinated guinea pigs showed a 90% protection as compared with the control group.

(B) Five calves were each given 4 intradermal injections of the vaccine at intervals of one week. Each injection was the equivalent of approximately 5000 *Dictyocaulus vipiparus* larvae. Three weeks after the last injection the calves and five untreated control calves were challenged with 4000 normal infective larvae. Clinical observations including type and rate of respiration and faeces examinations were carried out daily. Thirty days after challenge all the animals were killed and the lungs were examined for pathological lesions.

The respiratory rates of the control animals more than doubled after challenge and they showed clinical symptoms typical of parasitic bronchitis caused by *Dictyocaulus viviparus.* At post-mortem their lungs showed large areas of collapse and consolidation.

In contrast, the vaccinated animals showed only a slight increase in respiratory rate and at post-mortem lung damage was considerably less than that observed in the control animals.

The vaccine prepared in accordance with Example 2 was tested in lambs. Five lambs were each given subcutaneous injections of the vaccine with an interval of 21 days between the injections. Each injection was the equivalent of approximately 5000 *Haemonchus contortus* larvae. Ten days after the second injection the lambs together with five untreated control lambs were each challenged with 5000 infective larvae. Measurements of blood values were made weekly after challenge for four weeks. At the end of this period all the animals were killed and the worms contained in the abomasum of each animals were counted. The control animals suffered from severe anaemia, the red blood cell count, the packed cell volume and the haemoglobin level being reduced to about half of the original values whereas the vaccinated animals showed much smaller reduction in these values. The mean number of worms found in the control animals was three times that found in the vaccinated animals.

The vaccine prepared according to Example 4 was tested in foals as follows:

Eight guinea pigs were each given two intraperitoneal injections of the vaccine with an interval of 21 days befurther intradermal injection three months later. Each injection was approximately the equivalent of 9000 larvae of *Strongylus vulgaris.* These vaccinated animals and six untreated control foals were allowed to graze on a paddock known to be infected with *Strongylus vulgaris.* Five months after the last injection one vaccinated and one control animal were killed and post-mortem examinations were carried out.

*Strongylus vulgaris* enters the arterial system of the horse where it causes arteritis and its effect on the animal is best judged by an examination of the arterial pathology produced.

In the animals so far killed in this test, it has been found that in the control there was a true aortic aneurysm, whereas in the vaccinate this lesion was not found.

The vaccine prepared in accordance with Example 6 was tested as follows:

Five rabbits were each given 2 intra-peritoneal injections of the vaccine with an interval of 21 days between injections. Each injection was equivalent to approximately 3000 larvae of *Strongyloides papillosus.* Four months after the second injection the rabbits and a similar number of untreated control rabbits were each challenged by applying 150,000 infective filariform larvae to the skin. Ten days after challenge the rabbits were all killed and the small intestines examined for the presence of parasites.

In the control group 112,411 parasites had become established whereas in the vaccinated group the total was only 5,528. The degree of protection in the vaccinates in this experiment was 95%.

The vaccine prepared according to Example 8 was tested as follows:

Eight guinea pigs were each given two intraperitoneal injections of the vaccine with an interval of 21 days between injections. The dose of vaccine administered ranged from approximately the equivalent of 250 to approximately the equivalent of 2000 *Trichostrongylus colubriformis* larvae. Ten days after the second injection the test animals and the untreated control guinea pigs were challenged with 5000 infective larvae. The animals were killed 8 days after challenge. At postmortem the mean of the worms recovered from the control animals was 2035 whereas the mean in the vaccinates was only 179. The degree of protection afforded by the vaccine in this experiment was, therefore, in excess of 90%.

The following test results further show the advantages of the invention.

EXPERIMENT A

Two groups of five guinea pigs were used in this experiment. The animals in one group (A) were given an injection of vaccine against *Dictyocaulus viviparus,* prepared according to Example 1, followed by a second similar injection after an interval of 21 days. The second group (B) were used as the untreated controls. Ten days after the second injection each animal in both groups was challenged with 5,000 live infective Dictyocaulus larvae. On the 10th day after this challenge all the animals were killed and the number of worms in the lungs determined. It had previously been determined that maximum differences between worm burdens of resistant and susceptible animals occurred 10 days after challenge. The results of this experiment are tabulated below.

| Group | Worm burdens: Individual count | Worm burdens: Group total | Worm burdens: Group mean | Protection, percent | "t" significance test |
|---|---|---|---|---|---|
| A | 0, 4, 12, 0, 1 | 17 | 3 | 97 | t=3.53 highly significant |
| B | 193, 54, 165, 55 | 467 | 117 | ------------ | ------------ |
| | Died from bacterial infection prior to challenge | | | | |

EXPERIMENT B

In this experiment a vaccine against *Dictyocaulus viviparus,* prepared according to Example 1, was administered to a group (A) of 17 guinea pigs. Two injections were given with an interval of 21 days. Ten days later this group and a corresponding group (B) of untreated animals were challenged with 5,000 live infective larvae per guinea pig. 10 days after challenge, all the animals were killed and the number of worms in the lungs of each was ascertained.

The results of this experiment are given below:

| | Group A—Vaccinated | Group B—Untreated controls |
|---|---|---|
| | 25 | 211 |
| | 9 | 156 |
| | 6 | 174 |
| | 3 | 127 |
| | 108 | 137 |
| | 9 | 230 |
| | 77 | 68 |
| | 60 | 91 |
| | 2 | 24 |
| | 0 | 5 |
| | 19 | 91 |
| | 1 | 1 |
| | 7 | 13 |
| | 66 | 92 |
| | 113 | 326 |
| | 0 | 33 |
| | 50 | 145 |
| Group totals | 555 | 1,926 |
| Group mean | 32 | 113 |

"$t$" significance test: $t$=2.92 significant at 1% level.

EXPERIMENT C

Three groups of five guinea pigs were treated with vaccine prepared according to Example 1, each group receiving a different batch of vaccine. Two injections were given with a 21 day interval. One control group received injections of a balanced salt solution and a second control group received doses of medium corresponding to that used for preparation of the vaccine. The animals in all groups were challenged and killed and the worm burdens determined the same way as the animals in Experiments A and B.

| Vaccine Batch | Dose Level (LE) | Worm burdens: Individual Count | Worm burdens: Group total | Worm burdens: Group mean | Protection percent | "t" significance test |
|---|---|---|---|---|---|---|
| 1 | 2,500 | 0<br>21<br>10<br>8<br>5 | 44 | 9 | 96 | t−4.57 very highly significant |
| 2 | 2,500 | 6<br>17<br>14<br>42<br>13 | 91 | 18 | 91 | t=4.32 highly significant |
| 3 | 2,500 | 34<br>11<br>15<br>21<br>1 | 82 | 16 | 92 | t=4.37 highly significant |
| Controls: | | | | | | |
| Balanced salt solution | | (1)<br>(1)<br>181<br>132<br>145 | 1,568 | 196 | | |
| Background media | | 232<br>133<br>394<br>129<br>222 | | | | |

[1] Died from bacterial infection prior to challenge.

EXPERIMENT D

A vaccine against *Trichostrongylus colubriformis* was prepared according to Example 8 and administered to groups of five guinea pigs. Two injections were given with an interval of 21 days. The dose of vaccine administered to each animal is expressed, in the table overleaf, as "larval equivalents." Each animal in the experiment, including the nonvaccinated control group, were challenged with 20,000 live infective *Trichostrongylus colubriformis* larvae ten days after the second dose of vaccine. As will be seen from the table the vaccine protected the animals from death caused by larvae of *Trichostrongylus colubriformis.*

| Dose level administered to each group of five guinea pigs in larval equivalents (LE) | Number of deaths resulting in each group |
|---|---|
| 1 | |
| 50,000 | 0 |
| 2,000 | 0 |
| 2,500 | 0 |
| Uninoculated control | 4 |

EXPERIMENT E

Groups of five rabbits were treated with vaccine against *Strongyloides papillosus* prepared according to Example 6. Two doses were administered with an interval of 21 days. Ten days after the second dose of vaccine all animals in the experiment, including non-vaccinated controls, were challenged with 150,000 live infective *Strongyloides papillosus* larvae. Ten days after challenge the animals were killed and worm burdens determined. From the results given below it will be seen that 95% protection was achieved when a large challenge dose of larvae was given.

| Experiment | Group treatment | Worm burdens: Individual count | Worm burdens: Group total | Worm burdens: Group mean | Protection, Percent |
|---|---|---|---|---|---|
| A | Injected twice with vaccine | 900<br>296<br>3,254<br>573<br>505 | 5,528 | 1,105 | 95 |
| | Uninjected Controls | 32,134<br>24,681<br>11,344<br>40,812<br>3,440 | 112,411 | 22,482 | |

The aforementioned experiment was repeated using a challenge dose of 75,000 larvae. In this case 99% protection was achieved.

| Experiment | Group treatment | Worm burdens: Individual count | Worm burdens: Group total | Worm burdens: Group mean | Protection, Percent |
|---|---|---|---|---|---|
| B | Injected twice with vaccine | 17<br>34<br>27<br>8 | 86 | 21 | 99 |
| | Uninjected controls | 3,216<br>410<br>2,368<br>265 | 6,259 | 1,564 | |

What is claimed is:

1. An injectable nonliving veterinary vaccine containing the antigens from a nematode belonging to the order Rhabdiasoidea which is pathogenic to domestic animals and which goes through the infective third stage larvae and in a subsequent stage the fourth stage infective larvae, in a concentration equivalent to between 250–9000 fourth stage larvae, in an injectable inert carrier.

2. A vaccine according to claim 1 wherein the nematode is *Strongyloides papillosus.*

3. The process for prepartion of an injectable nonliving veterinary vaccine according to claim 1 which comprises:

(1) incubating third stage infective larvae obtained from incubated faeces of infected animals, at about 37° C., in vitro, during the antigen producing stage, in a sterile aqueous culture medium until 90% exsheathment has occurred, separating the larvae from the aqueous solution, (2) incubating the larvae from step (1) at about 37° C. in medium containing nutrient material until at least 60% conversion to the fourth larvae stage has occurred, (3) freeze-drying the culture medium and larvae from step (2), (4) suspending the product from step (3) in such an amount of sterile water that a vaccine containing the equivalent of 250–9000 fourth stage larvae is obtained.

4. An injectable nonliving veterinary vaccine containing the antigens from a nematode belonging to the order Strongyloidea which is pathogenic to domestic animals and which goes through the infective third stage larvae and in a subsequent stage the fourth stage infective larvae, in a concentration equivalent to between 250–9000 fourth stage larvae, in an injectable inert carrier.

5. A vaccine according to claim 4 wherein the nematode is *Dictyocaulus viviparus.*

6. The method of combatting parasitic bronchitis caused by *Dictyocaulus viviparus* in calves, which comprises injecting intradermally four times the vaccine of claim 5 of a concentration equivalent each time to 5000 *Dictyocaulus viviparus* larvae.

7. A vaccine according to claim 4 wherein the nematode is *Ostertagia oestertagi.*

8. A vaccine according to claim 4 wherein the nematode is *Haemonchus contortus.*

9. A vaccine according to claim 4 wherein the nematode is *Trichostrongylus colubriformis.*

10. A vaccine according to claim 4 wherein the nematode is *Trichostrongylus axei.*

11. A vaccine according to claim 4 wherein the nematode is *Strongylus vulgaris.*

12. The process for the preparation of an injectable nonliving veterinary vaccine according to claim 4 which comprises:

(1) incubating third stage infective larvae obtained from incubated faeces of infected animals, at about 37° C., in vitro, during the antigen producing stage, in a sterile aqueous culture medium until 90% exsheathment has occurred, separating the larvae from the aqueous solution, (2) incubating the larvae from step (1) at about 37° in a medium containing nutrient material until at least 60% conversion to the fourth larvae stage has occurred, (3) freeze-drying the culture medium and larvae from step (2), (4) suspending the product from step (3) in such an amount of sterile water that a vaccine containing the equivalent of 250–9000 fourth stage larvae is obtained.

13. The process according to claim 12 wherein said solution from step (1) is freed of inorganic ions and added to the product from step (2) before drying.

14. The process according to claim 12 wherein at least one antibiotic is added during step (2).

15. The process for the preparation of a vaccine according to claim 14 wherein penicillin, streptomycin and nystatin are added in step (2) and the culture medium in step (2) consists of Tyrodes solution with liver extract.

References Cited

UNITED STATES PATENTS 3,010,875 11/1961 Cappel et al. ------- 167—84.5

FOREIGN PATENTS 564,575 2/1958 Belgium.

OTHER REFERENCES

Soulsby, Nature, vol. 179, No. 4563, pp. 783 and 784, Apr. 13, 1957.

Soulsby, J. Comp. Path., vol. 68, pp. 71–81, 1958.

RICHARD L. HUFF, *Primary Examiner.*